April 28, 1925.
V. LINK
1,535,730
BRAKE MECHANISM
Filed Jan. 9, 1922
2 Sheets-Sheet 1
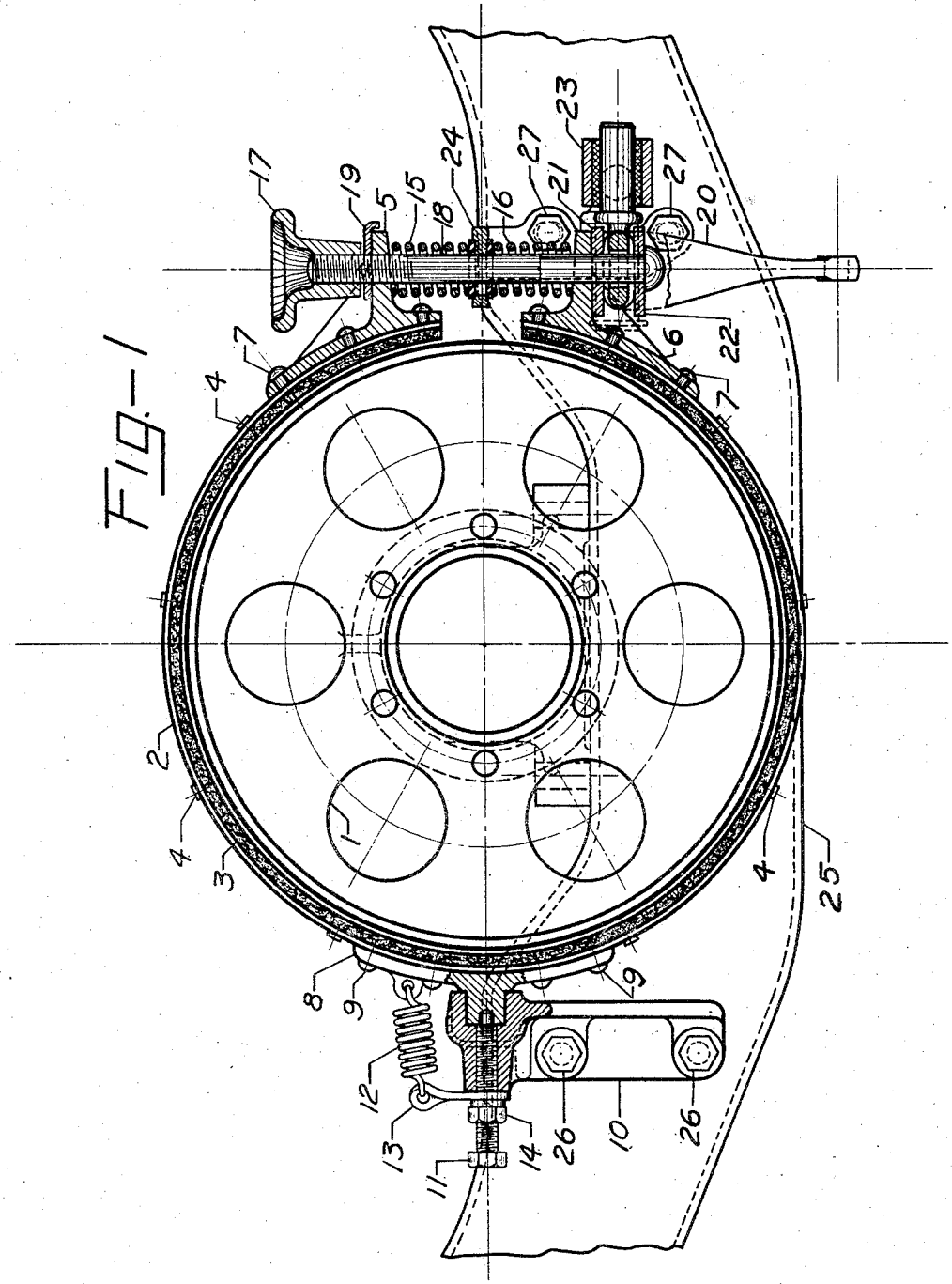
INVENTOR
VINCENT LINK.
BY
William MacGlashan
ATTORNEY April 28, 1925.
V. LINK
BRAKE MECHANISM
Filed Jan. 9, 1922
1,535,730
2 Sheets-Sheet 2
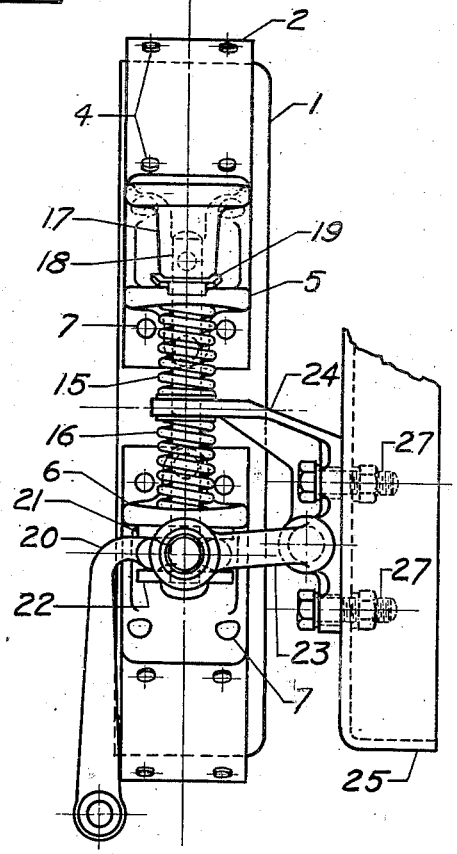
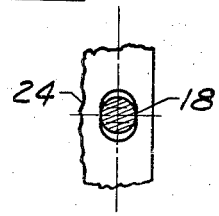
INVENTOR
VINCENT LINK.
BY
William MacGlashan
ATTORNEY Patented Apr. 28, 1925.

1,535,730

UNITED STATES PATENT OFFICE.

VINCENT LINK, OF DETROIT, MICHIGAN, ASSIGNOR TO STUDEBAKER CORPORATION, A CORPORATION OF NEW JERSEY.

BRAKE MECHANISM.

Application filed January 9, 1922. Serial No. 528,044.

*To all whom it may concern:*

Be it known that I, VINCENT LINK, a citizen of the United States of America, and resident of Detroit, in the county of Wayne and State of Michigan, have invented certain new and useful Improvements in Brake Mechanisms, of which the following is a specification.

This invention relates to band brakes of the type shown in the accompanying drawings in which there is a spring between each end of the brake band and the brake anchorage therebetween, and the object is to provide a means whereby any variations in position of the ears or flanges on the ends of the brake band in relation to the band anchorage on the opposite side of the brake, or any variation in the length or tension of said springs can be compensated for by adjusting the anchorage between the ends of the band, allowing the wear of the band to be taken up simultaneously and equally thereafter on both sides of the band opening by means of a single nut.

Heretofore there has been no adequate means for compensating for the irregularities of manufacture occurring in such brake mechanisms with the result that the clearance between the brake drum and band is often uneven to an objectional point. Moreover, when the anchorage interposed between the springs is not adjustable, irregularities of its position due to manufacture are liable to accentuate the variations occurring in the rest of the mechanism. It is manifest then, that by making the anchorage between the springs adjustable, any variations occurring in the position of the ears or flanges on the ends of the band in regard to the position of the anchorage at the opposite side of the brake, or in the length or tension of the springs holding the brake band in operative position, may be compensated for, and in addition any variation of manufacture in the position of the latter anchorage may be entirely compensated for by adjusting the first mentioned anchorage.

In order to more clearly describe my invention I will refer to the accompanying drawings in which:

Figure 1 is an end view of a brake mechanism in which my present invention is embodied.

Figure 2 is a side view of the same, and

Figure 3 is a view of a bolt hole in the adjustable band anchorage referred to above.

1 is a brake drum secured at its center to a rotatable shaft, the shaft not being shown. 2 is a brake band lined with suitable material 3, held in position by rivets 4. 5 and 6 are ears or flanges fastened to the ends of the brake band 2 by the rivets 7. 8 is a member fastened to the brake band 2 by rivets 9 and works in conjunction with the brake anchorage 10 for preventing the brake band from turning with the drum 1 and allowing the brake band 2 to move to and from the drum 1 at that point. 11 is a stop screw limiting the distance of the band 2 from the drum at that point when in inoperative position. 12 is a coil spring for holding the brake band 2 away from the drum 1 when not in use. 13 is an anchorage for the spring 12 and is placed over the screw 11 and held in place by the nut 14. The ends of the brake band 2 are held away from the brake drum 1 when not in operation by the coil springs 15 and 16 seating on the ears 5 and 6, and the amount of clearance at these points is limited by the nut 17 acting in conjunction with the bolt 18. A washer 19 is anchored on the ear 5 and under the nut 17 and has a projection which matches with a recess in the nut 17, preventing the latter from turning unintentionally. A cam member 20 provided with a cam, a pivot or bearing member and an actuating lever of the shape shown is placed with the cam proper over the bolt 18 and between the hardened washers 21 and 22, the upper one 21 which is placed under and against the ear or flange member 6 and the lower one 22 which is placed over and against the head of the bolt 18. Upon movement of the cam member 20 about its pivot the washers 21 and 22 are forced apart drawing the ears or flanged members 5 and 6 into closer relationship and contracting the band 2 and lining 3 about the drum 1, thereby causing a braking action on the drum 1. The pivot or bearing member of the cam member 20 is journaled in the end of a link member 23 which takes up the force or pull exerted on the lever of the cam member 20 upon operation of the brake. The other end of the link member 23 is journaled in an adjustable brake anchorage 24 which is the principal subject of this invention. The brake anchorages 10 and 24 are fastened to a supporting member 25 by the bolts 26 and 27 respectively. The brake anchorage 24 positions the springs 15 and 16, thereby regulating the clearance between the brake lining 3 and drum 1 on each side of the band opening. The anchorage or bracket 24 has elongated openings therein thru which the supporting bolts 27 pass to hold it to the support 25, which allow its position to be adjusted to suit conditions of clearance. The lateral movement of the bolt 18 due to contraction of the band 2 is taken care of by a lateral elongation of the opening in the anchorage 24, thru which the bolt 18 passes.

Formal changes may be made in the specific embodiment of the invention described without departing from the spirit or substance of the broad invention, the scope of which is commensurate with the appended claims.

What I claim is:

1. In a braking mechanism, a support, a brake drum, a brake band surrounding said brake drum supported intermediate its ends on said support, brackets having openings therein secured to said brake band adjacent its ends, a bolt extending through said openings in said brackets, springs mounted on said bolt intermediate said brackets, means on the outer end of said bolt to adjust the tension of said springs, a bracket having an end interposed between said springs adjustably mounted on said support, said bracket being adapted to equalize the clearance between the ends of said brake band and said brake drum.

2. In a braking mechanism, a brake drum, a brake band, brackets having openings therein secured to said brake band adjacent its ends, a bolt extending through said openings in said brackets, a cam interposed between the head of said bolt and one of said brackets, means to operate said cam to contract said brake band, springs mounted on said bolt intermediate said brackets, a nut on the end of said bolt opposite said head to adjust the tension of said springs, and adjustable means interposed between said springs for equalizing the clearance between the ends of said brake band and said brake drum, said means having an opening therein to allow for movement of said bolt toward said brake drum when said brake band is contracted.

3. In a braking mechanism, a support, a brake drum, a brake band surrounding said brake drum supported intermediate its ends on said support, brackets having openings therein secured to said brake band adjacent its ends, a bolt extending through said openings in said brackets, springs surrounding said bolt intermediate said brackets, means to adjust the tension of said springs, a bracket adapted to equalize the clearance between said brake band and said brake drum having an end interposed between said springs adjustably mounted on said support, a cam pivotally supported by said brackets interposed between the head of said bolt and one of said brackets, and means to operate said cam to contract said brake band.

Signed by me at Detroit, Michigan, U. S. A., this 7th day of January, 1922.

VINCENT LINK.

Witnesses:
ELMER L. McINTYRE,
HODGSON S. PIERCE.